United States Patent
Chakraborty et al.

(10) Patent No.: US 7,437,939 B1
(45) Date of Patent: Oct. 21, 2008

(54) PRESSURE AND MECHANICAL SENSORS USING TITANIUM-BASED SUPERELASTIC ALLOY

(75) Inventors: Swapan Chakraborty, Eden Prairie, MN (US); David A. Broden, Andover, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 11/787,048

(22) Filed: Apr. 13, 2007

(51) Int. Cl.
*G01L 7/08* (2006.01)
(52) U.S. Cl. .................................................... 73/715
(58) Field of Classification Search ................ 73/715, 73/718, 724; 210/490
See application file for complete search history.

(56) References Cited

U.S. PATENT DOCUMENTS

| | | |
|---|---|---|
| 6,295,875 B1 | 10/2001 | Frick et al. |
| 6,607,693 B1 | 8/2003 | Saito et al. |
| 6,843,133 B2 | 1/2005 | Broden et al. |
| 6,979,375 B2 | 12/2005 | Furuta et al. |
| 2002/0046970 A1* | 4/2002 | Murase et al. ............ 210/483 |
| 2003/0102062 A1 | 6/2003 | Furuta et al. |
| 2004/0055675 A1 | 3/2004 | Kuramoto et al. |
| 2004/0115083 A1 | 6/2004 | Furuta et al. |
| 2005/0072496 A1 | 4/2005 | Hwang et al. |
| 2005/0115889 A1* | 6/2005 | Schaevitz et al. ........... 210/490 |
| 2006/0008766 A1 | 1/2006 | Fischer |
| 2006/0016268 A1* | 1/2006 | Nagasaka et al. ............. 73/777 |
| 2007/0249082 A1* | 10/2007 | Hanaoka et al. ............... 438/53 |
| 2007/0298238 A1* | 12/2007 | Witvrouw et al. ........ 428/304.4 |

OTHER PUBLICATIONS

Saito et al., Multifunctional Alloys Obtained via a Dislocation-Free Plastic Deformation Mechanism, Science, vol. 300, 464-467, (Apr. 2003).
Nishino, Super Multifunctional Alloy "Gum Metal", R&D Review of Toyota CRDL vol. 38, No. 3 (2003).
Kuramoto et al., Plastic Deformation in a Multifunctional Ti-Nb-Ta-Zr-O Alloy, Metallurgical and Materials Transactions A, vol. 37A, 657 (2006).
A. Fontanazza et al., Morphing Wing Technologies Research, 1st SEAS DTC Technical Conference—Edinburgh 2006.
Toyota's production line leads from lab to road, Nol. 435, Jun. 23, 2005.

* cited by examiner

*Primary Examiner*—Andre J Allen
(74) *Attorney, Agent, or Firm*—Kinney & Lange P.A.

(57) ABSTRACT

Pressure and mechanical sensors include a sensing component formed of a titanium and tantalum alloy having an elastic (Young's) modulus of less than about 80 GPa and a tensile strength of greater than about 1,000 MPa. The high strength and low elastic modulus, together with very low temperature dependence of the elastic modulus and very low linear thermal expansion, result in high resolution and precise measurement over a large temperature range.

33 Claims, 6 Drawing Sheets

PRESSURE AND MECHANICAL SENSORS USING TITANIUM-BASED SUPERELASTIC ALLOY

BACKGROUND OF THE INVENTION

The present invention relates to mechanical sensors, such as capacitive pressure sensors, that have deflectable components. In particular, the present invention relates to a sensor with a deflectable component formed of a titanium-based alloy having an extremely low Young's modulus, an extremely high tensile strength, and stable characteristics over a large temperature range.

Capacitive pressure sensors have found widespread use in industrial, aerospace, and other control and monitoring systems. Capacitive pressure sensors can be configured to sense absolute pressure, gauge pressure, differential pressure, or combinations of those pressures.

Capacitive pressure sensors have been fabricated from a variety of materials, including metal, glass, sapphire, and silicon. The performance of capacitive pressure sensors depends upon the physical characteristics of the material forming the deflectable components of the sensor, such as the center diaphragm of a two chamber capacitive pressure sensor. These physical characteristics include elastic modulus (or Young's modulus), tensile strength of the material, temperature dependence of the elastic modulus and tensile strength, thermal expansion properties, and hysteresis effects.

Other mechanical sensors which rely upon deflection of a sensing component are also affected by the same material properties. There is a continuing need for improvements to capacitive pressure sensors and other mechanical sensors having deflectable sensing components to provide extended operating range, low hysteresis, greater signal-to-noise ratio, reduced correction for temperature effects, and improved stability in temperature hysteresis.

BRIEF SUMMARY OF THE INVENTION

The present invention is an improved sensor that includes a deflectable component formed of a titanium-based alloy having a Young's modulus of less than about 80 GPa and a tensile strength of greater than about 1,000 MPa. The titanium-based superelastic alloy may include, for example, titanium, a group IVa element, a group Va element other than titanium, and an interstitial element. The titanium alloy may be, for example, of a composition of the alloy group Ti-24 at. % (Nb+Ta+V)—(Zr, Hf)—O.

In one embodiment, the sensor is a capacitive pressure sensor, and the component is a diaphragm that deflects as a function of pressure to be sensed. In this embodiment, the titanium alloy provides a near zero temperature dependence and near zero linear thermal expansion over a temperature range of about 100° K to 500° K. The high tensile strength results in low hysteresis, extended operating range, and improved over-pressure characteristics. The low Young's modulus results in a higher signal-to-noise ratio than achieved with a conventional pressure sensor having a diaphragm such as stainless steel.

DETAILED DESCRIPTION

Figure 1:
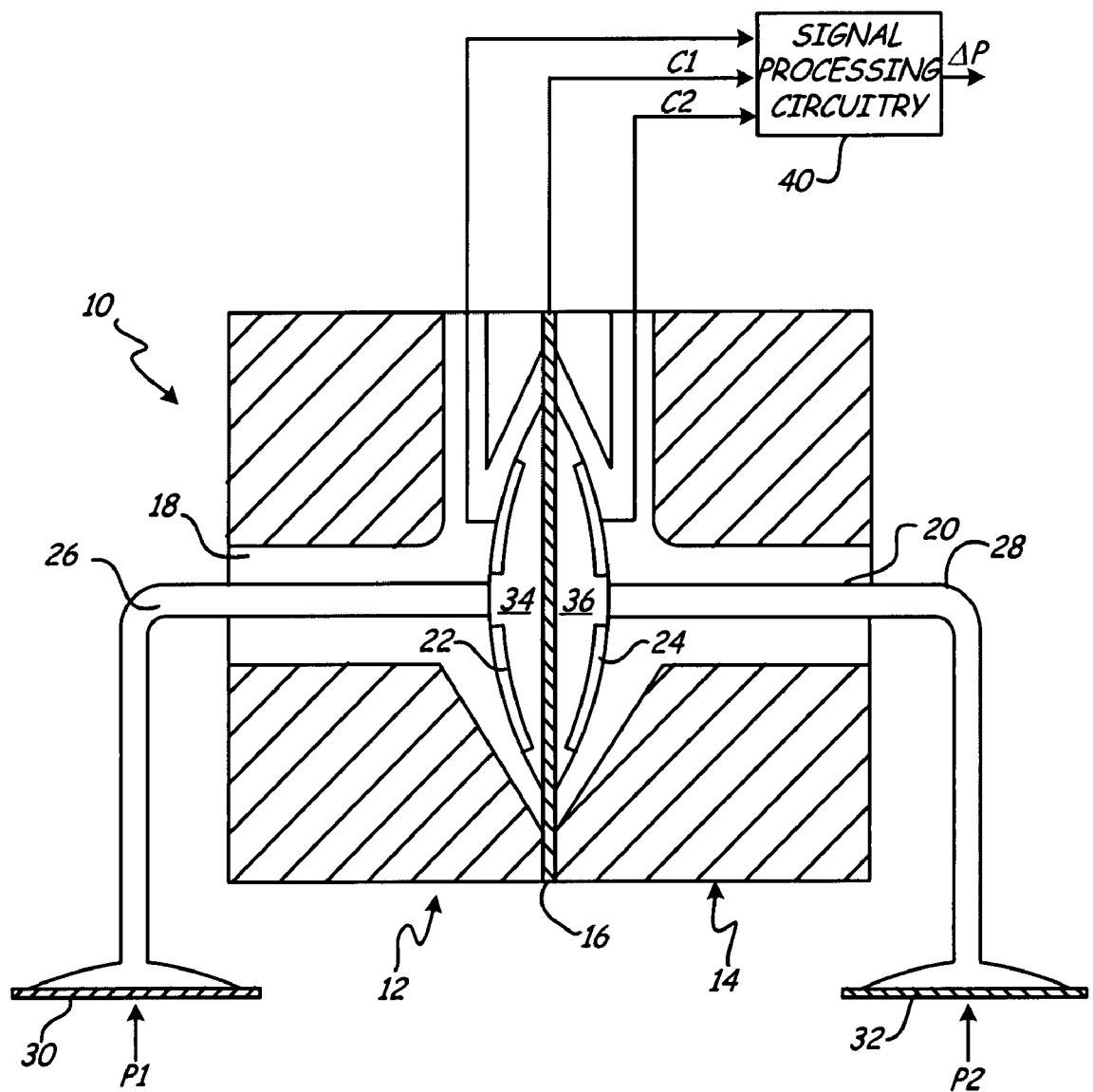
FIG. 1 is a cross-sectional view of a differential pressure cell having a titanium-based superelastic alloy center diaphragm and isolation diaphragms.

FIG. 1 is a cross-sectional view of differential pressure sensor 10, which makes use of titanium-based superelastic alloy components. Pressure sensor 10 includes cell halves 12 and 14, central diaphragm 16, insulators 18 and 20, electrodes 22 and 24, isolator tubes 26 and 28, and isolator diaphragms 30 and 32. In this embodiment, central diaphragm 16 and isolator diaphragms 30 and 32 (and optionally cell halves 12 and 14) are formed of a titanium alloy having a Young's modulus of less than about 80 GPa and a tensile strength of greater than about 1000 GPa.

In this embodiment, differential pressure sensor 10 is a capacitive sensor. Central diaphragm 16 divides the space between cell halves 12 and 14 into first chamber 34 and second chamber 36. Isolator tubing 26 extends from isolator diaphragm 30 through cell half 12 to first chamber 34. Similarly, isolator tubing 28 extends from isolator diaphragm 32 to second chamber 36.

Electrode 22 is formed on the inner wall of insulator 18, while electrode 24 is formed on the inner wall of insulator 20. Electrode 22 and central diaphragm 16 form a first sensing capacitor having capacitance C1, while second electrode 24 and central diaphragm 16 form a second sensing capacitor having capacitance C2.

Chambers 34 and 36 and isolator tubes 26 and 28 are filled with a dielectric fill fluid. When process fluid applies a pressure P1 to isolator diaphragm 30, that pressure is transmitted by the dielectric fill fluid through isolator tube 26 into chamber 34. Similarly, when a process fluid applies a second pressure P2 to isolator diaphragm 32, pressure P2 is transmitted by fill fluid through isolator tube 28 to second chamber 36.

Capacitances C1 and C2 change as central diaphragm 16 deflects in response to applied pressures P1 and P2. The amount of deflection is a function of the difference between pressures P1 and P2. This differential pressure can be derived by measuring capacitances C1 and C2. Signal processing circuitry 40 converts measured capacitances C1 and C2 into an output value that is representative of differential pressure.

Differential pressure sensor 10 makes use of titanium-based alloys having a very low Young's modulus, high tensile strength, near zero linear thermal expansion, and near zero temperature dependence of the Young's modulus. The low Young's modulus results in improved signal-to-noise performance of pressure sensor 10 because the lower the Young's modulus, the larger the strain (deflection) for a given pressure. The higher tensile strength results in low hysteresis (essentially zero up to the elastic limit), extended operating range, and a higher overpressure limit. The low thermal expansion coefficient and low temperature dependence of Young's modulus results in reduced temperature correction of pressure sensor 10, improved stability, and reduced temperature hysteresis.

Examples of titanium superelastic alloys are described in Saito et al. U.S. Pat. No. 6,607,693; Furuta et al. U.S. Pat. No. 6,979,375; Kuramoto et al. U.S. Patent Publication No. 2004/

0055675; Furuta et al. US Patent Publication No. 2004/0115083; and Whang et al. US Patent Publication No. 2005/0072496. These titanium-based superelastic alloys are referred to by the trade designation GUM METALS by Toyota Central R&D Labs, Inc., Aichi, Japan. They also have been described in Saito et al., Multifunctional Alloys Obtained via a Dislocation-Free Plastic Deformation Mechanism, Science, Vol. 300, 464-467 (April 2003); Nishino, Super Multifunctional Alloy "GUM METAL", R&D Review of Toyota CRDL Vol. 38, No. 3 (2003); and Kuramoto et al., Plastic Deformation in a Multifunctional Ti—Nb—Ta—Zr—O Alloy, Metallurgical and Materials Transactions A, vol. 37A, 657 (2006).

The titanium-based superelastic alloys include titanium, a IVa group element (such as zirconium (Zr) or hafnium (Hf)), a group Va element other than titanium (such as vanadium (V), niobium (Nb), or tantalum (Ta)), and an interstitial element such as oxygen, nitrogen, or carbon. The group IVa element (Zr or Hf) contributes to lower Young's modulus and increase strength. The group Va elements (V, Nb, and Ta) contribute to lower Young's modulus. The interstitial element (O, N, or C) contributes to increased strength. The alloy has a body centered cubic or body centered tetragonal crystal structure. The titanium-based superelastic alloy can be formed by a melting process or by sintering. The alloy is then subjected to cold working, which significantly increases its tensile strength. The low Young's modulus and high tensile (elastic limit) strength, with high elastic deformation capability, allows the alloy to have good cold working properties.

For mechanical sensors having a deflectable component (such as capacitive pressure sensor 10), the titanium-based superelastic alloys have a Young's modulus of 80 GPa or less, and preferably have a Young's modulus in the range of about 60 to 70 GPa. The elastic limit tensile strength of the alloy is at least about 1,000 MPa, and in some cases is 1,200 MPa or greater.

As reported by Saito et al. in Science, vol. 30, 464 (2003), for 90% cold-worked alloys, the linear expansion coefficient does not exceed $2\times 10^{-6}/°K$ over a temperature range from 100° K to 500° K. Thus the cold-worked titanium-based alloys exhibit linear expansion coefficient similar to Invar alloys but over a wider temperature range.

The temperature dependence of the Young's modulus is also near zero over an extended temperature range. As reported by Saito et al., the Young's modulus of the cold-worked titanium-based superelastic alloy remained essentially constant between 77° K and 500° K. This near zero temperature dependence is comparable to Elinvar alloys, but is present over a much wider temperature range.

The high strength and low Young's modulus, when used in the deflecting element (central diaphragm 16) of pressure sensor 10 offers very high resolution and precise pressure measurement. The temperature characteristics provide improved temperature stability performance over a wide range of 100° K to 500° K.

Because the alloys are corrosion resistant, isolation diaphragms 30 and 32 can also be formed of the same material as central diaphragm 16. The low thermal expansion of the titanium-based superelastic alloys allows central diaphragm 16 and isolation diaphragms 30 and 32 (as well as other components such as cups 12 and 14) to be used in conjunction with common low expansion solid state materials.

Titanium-based superelastic alloys have three additional common characteristics. First, they have a compositional average balance electron number [electron/atom (ea) ratio] of about 2.24. Second, they have a bond order (Bo value) of about 2.86 to about 2.90 based on the DV-Xα cluster method, which represent the bonding strength. Third, they have a "D" electron-orbital energy level (Md value) of about 2.43 to about 2.49. Examples of compositions meeting the criteria include Ti-12Ta-9Nb-3V—Zr—O and Ti-23Nb-0.7Ta-2Zr—O [mole percent (mol %)].

Stainless steel is a material most commonly used for industrial precision pressure and deflecting mechanical sensors. By way of comparison, the tensile strength of the titanium-based superelastic alloy at room temperature may be 1200 GPa, which is three times higher than conventional stainless steel. In addition, the Young's modulus at 300° K (room temperature) of the titanium-based superelastic alloy may be, for example, 60 GPa, which is four times lower than conventional stainless steel. The combination of extremely low Young's modulus and high tensile strength, together with the favorable thermal properties yields substantial improvement over sensors which use conventional stainless steel for the deflecting elements.

Figure 2:
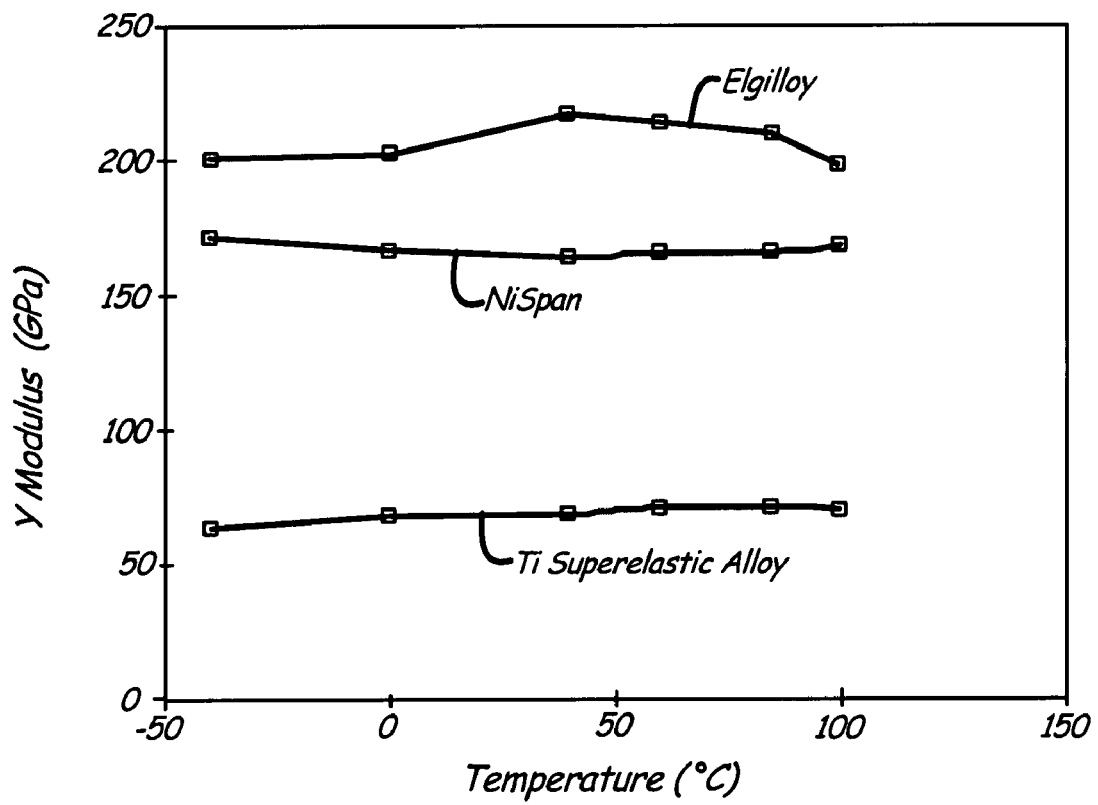
FIG. 2 is a graph comparing Young's modulus as a function of temperature for a titanium-based superelastic alloy, NiSpan and Elgilloy.
Figure 3:
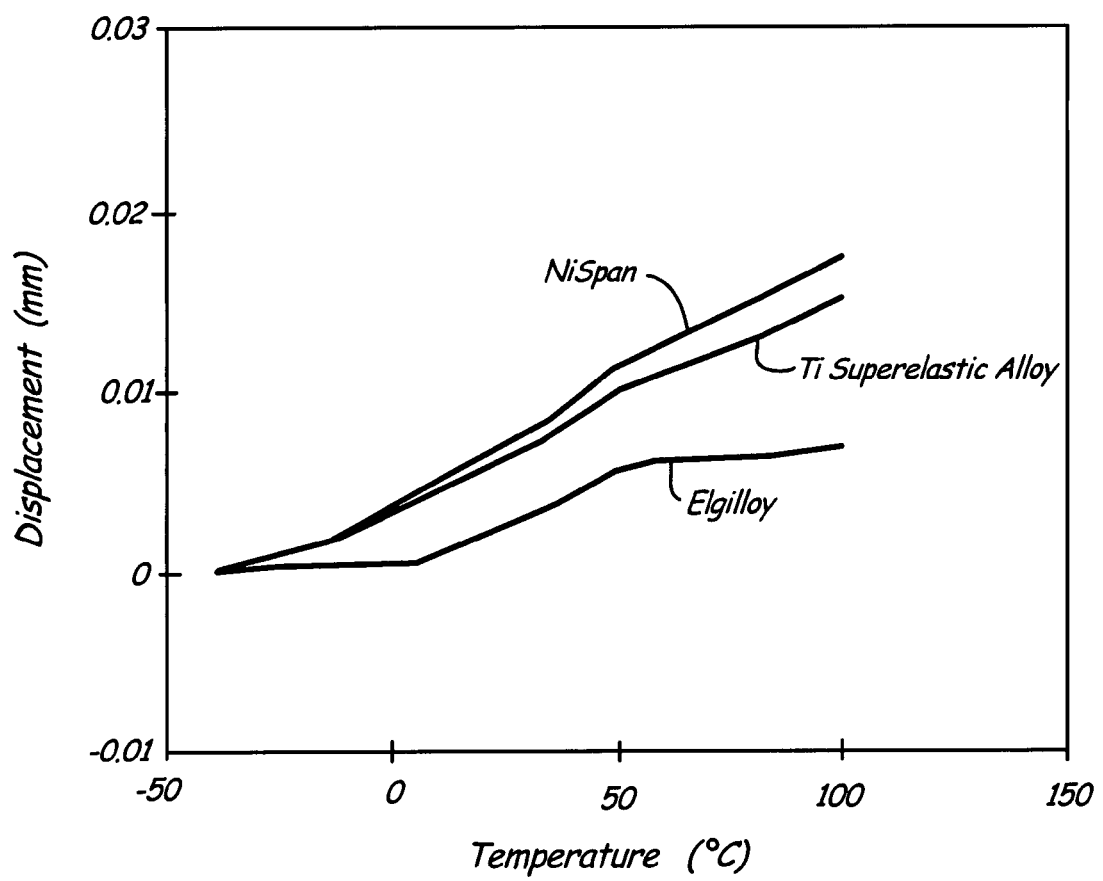
FIG. 3 is a graph comparing linear thermal expansion of titanium-based superelastic alloy, NiSpan and Elgilloy.
Figure 4:
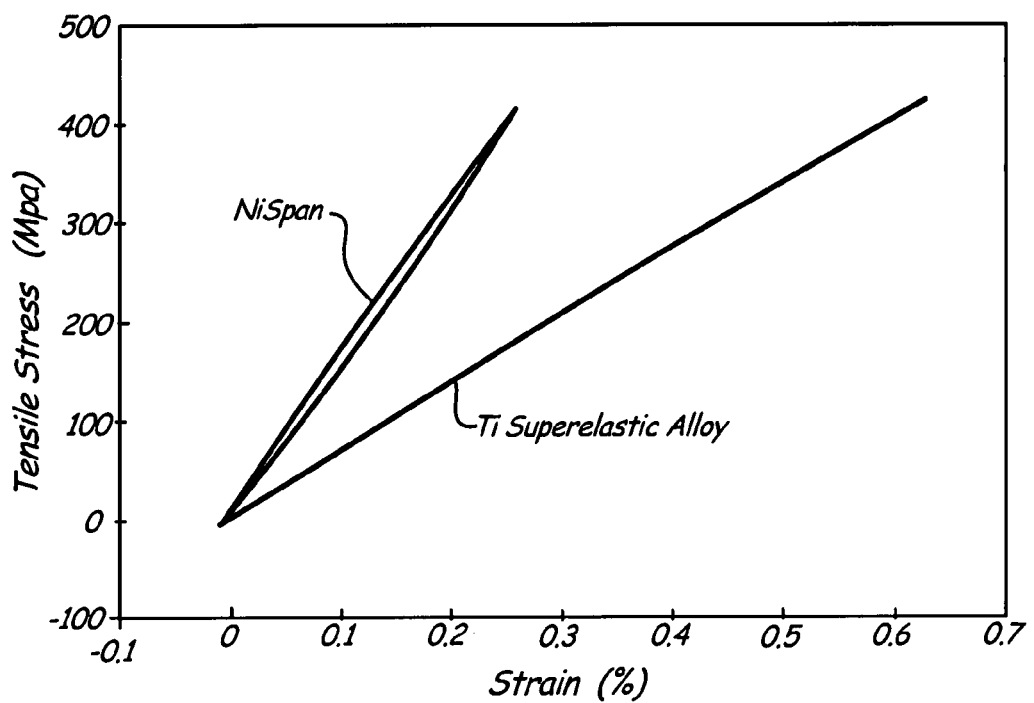
FIG. 4 is a graph comparing pressure hysteresis characteristics of NiSpan and titanium-based superelastic alloy.

FIGS. 2-4 compare characteristics of titanium-based superelastic alloys with two other alloy materials (Elgilloy and NiSpan) that have been used for pressure sensors due to their relatively low Young's modulus. FIG. 2 shows a comparison of Young's modulus for Elgilloy, NiSpan, and titanium-based superelastic alloy over a temperature range between −40° C. (233° K) and 100° C. (373° K). The titanium-based superelastic alloy has a substantially lower Young's modulus at all temperatures, and the variation in Young's modulus with temperature is less than either Elgilloy or NiSpan.

FIG. 3 shows linear expansion or displacement in millimeters as a function of temperature. The temperature of coefficient of titanium-based superelastic alloy is about $1.16\times 10^{-5}/°C$. This compares to NiSpan at $1.63\times 10^{-5}/°C$. and Elgilloy at $6.17\times 10^{-6}/°C$.

FIG. 4 shows pressure hysteresis characteristics of NiSpan and titanium-based superelastic alloy. In FIG. 3, tensile stress is shown as a function of % strain. As shown in FIG. 4, NiSpan exhibits hysteresis as strain increases from 0% to about 0.25%. In contrast, titanium-based superelastic alloy shows no hysteresis for strain between 0% and 0.6%.

The differential pressure sensor shown in FIG. 1 represents only one example of a mechanical sensor using a titanium-based superelastic alloy as a deflecting sensing component. For example, other capacitive pressure sensors using titanium-based superelastic alloy can be configured to measure absolute pressure or gauge pressure. In addition, the differential capacitive pressure sensor can be configured with cell halves in side-by-side configuration, with two deflecting diaphragms, rather than the configuration shown in FIG. 1.

In addition, the differential pressure sensor shown in FIG. 1 can include additional electrodes to create additional capacitors for linearization purposes. The use of additional electrodes is shown, for example, in U.S. Pat. No. 6,295,875.

In still another embodiment, a capacitive pressure sensor of the type described in U.S. Pat. No. 6,843,133 uses a titanium-based superelastic alloy as the deflecting sensing component (diaphragm). The sensor can feature direct contact of process fluid with the titanium-based superelastic alloy diaphragm, or can include an isolator and a delelctric fill fluid similar to the sensor shown in FIG. 1.

Figure 5:
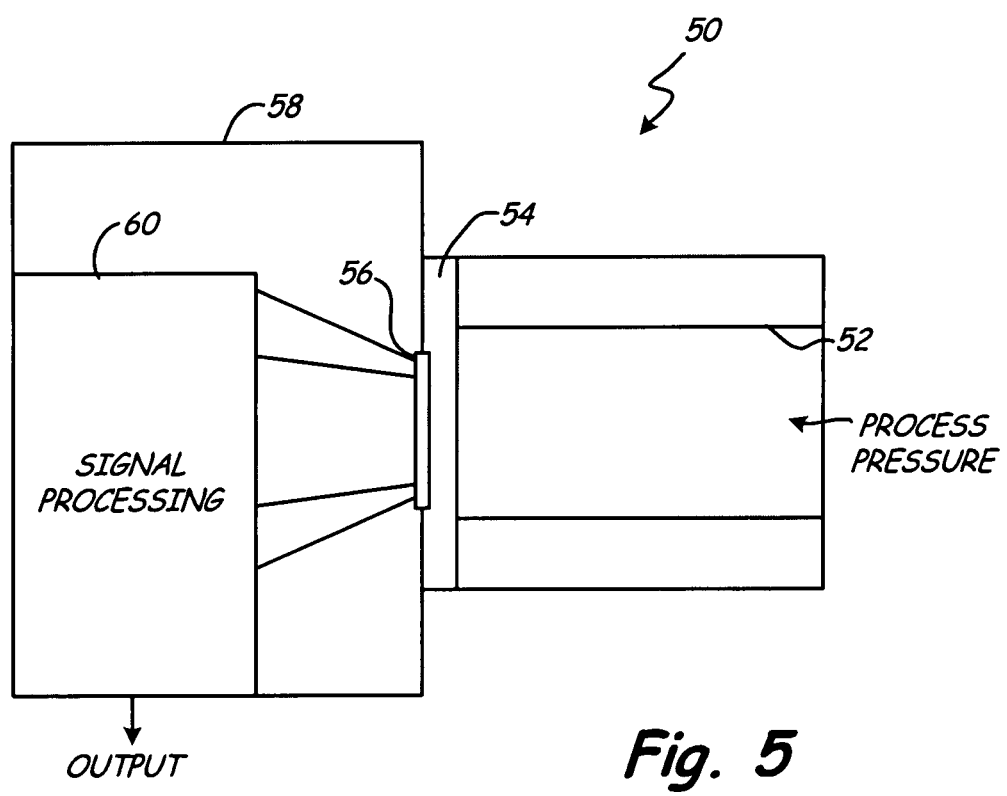
FIG. 5 is a cross-sectional view showing a pressure sensor with a deflectable superelastic alloy diaphragm with attached strain sensor.

FIG. 5 shows pressure sensor 50, which includes chamber 52, superelastic alloy diaphragm 54, strain sensitive bridge sensor 56, electronic signal processing compartment 58, and signal processing circuitry 60. Process pressure P is delivered to sensing chamber 52 and applies pressure against superelastic alloy diaphragm 54. The process pressure can be delivered directly by the process fluid, or by a dielectric fill fluid. The fluid pressure causes deflection of diaphragm 54, which in turn causes strain in strain sensitive bridge 56. Strain sensitive bridge 56 may be, for example, a silicon piezoresistive bridge that is bonded to, deposited on, or embedded in superelastic alloy diaphragm 54. The signals from bridge 56 are processed by signal processing circuitry 60 to produce an output which is a function of process pressure P. Compartment 58 may be vacuum sealed, so that the output is representative of absolute pressure, or may be maintained at atmospheric pressure, so that the output from signal processing circuitry 60 is representative of gauge pressure.

Figure 6:
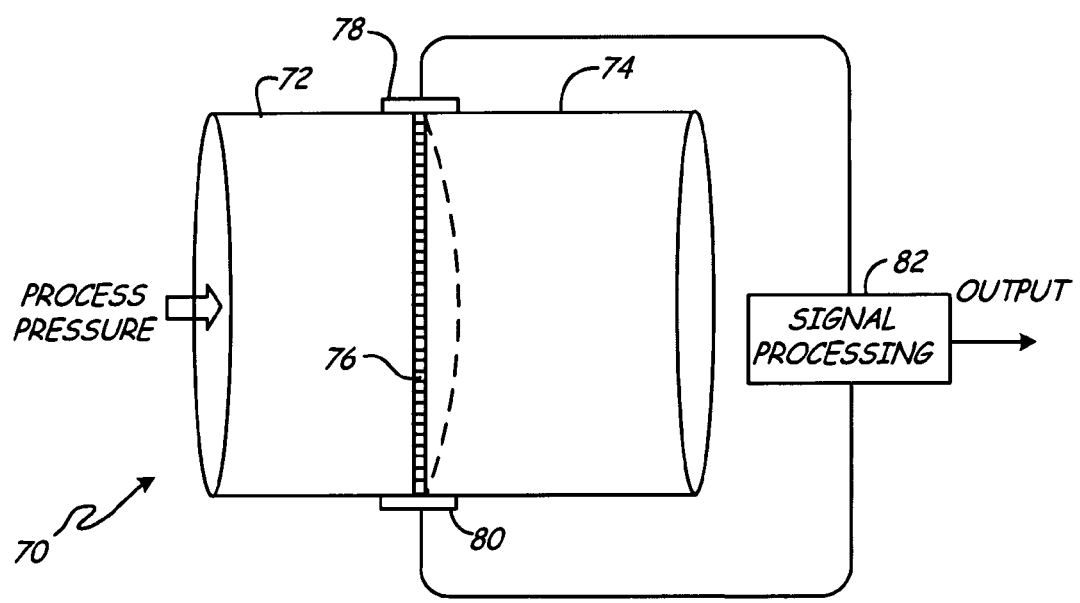
FIG. 6 shows a pressure sensor with a deflectable superelastic alloy diaphragm with a resistance that varies as a function of pressure.

FIG. 6 shows pressure sensor 70, which includes sensing chamber 72, reference chamber 74, superelastic alloy diaphragm 76, electrical contacts 78 and 80, and signal processing circuitry 82. Diaphragm 76 deflects based upon a difference in pressure between the process fluid pressure in chamber 72 and the pressure within reference chamber 74. If the reference pressure within chamber 74 is a vacuum, pressure sensor 70 measures absolute pressure. If the reference pressure is atmospheric, sensor 70 measures gauge pressure.

Signal processing circuitry 82 provides an output representative of measured pressure based upon the resistance between contact 78 and 80. The resistance of diaphragm 76 is a function of resistivity of the titanium-based superelastic alloy, the length of diaphragm 76 between contact 78 and 80, and the cross-sectional area of diaphragm 76. As pressure increases, diaphragm 76 deflects so that its length between contact 78 and 80 increases. The cross-section area, on the other hand, does not change appreciably, and the resistivity is unchanged. As a result, increased pressure results in increased resistance between contact 78 and 80.

As illustrated by the embodiments shown in FIGS. 1, 5, and 6, the titanium-based superelastic alloy diaphragm deflects as a function of pressure, and that deflection can be used to produce an output representative of pressure using sensed capacitance, sensed strain, or sensed resistance.

Although the present invention has been described with reference to preferred embodiments, workers skilled in the art will recognize that changes may be made in form and detail without departing from the spirit and scope of the invention.

The invention claimed is:

1. A sensor characterized by a deflectable component responsive to a parameter to be sensed and formed of a titanium-based alloy having a Young's modulus of less than about 80 GPa and a tensile strength of greater than about 1,000 MPa.

2. The sensor of claim 1 and further comprising a sensor body, wherein the deflectable component is mounted to the sensor body.

3. The sensor of claim 2, wherein the parameter to be sensed is pressure, and wherein the sensor body and the deflectable component define at least one pressure sensing chamber.

4. The sensor of claim 3, wherein the sensor comprises a capacitive differential pressure sensor and wherein the deflectable component comprises a central diaphragm positioned between a first chamber and a second chamber, the central diaphragm being deflectable as a function of fluid pressure in the first and second chambers.

5. The sensor of claim 4, wherein the first and second chambers are filled with dielectric fill fluid, and wherein first and second isolation diaphragms transmit pressure from a process fluid to the dielectric fill fluid in the first and second chambers, respectively.

6. The sensor of claim 5, wherein the first and second isolation diaphragms are formed of the titanium-based alloy.

7. The sensor of claim 1 and further comprising a strain responsive device attached to the deflectable component for producing an output as a function of deflection of the deflectable component.

8. The sensor of claim 1 and further comprising a circuit for providing an output as a function of resistance of the deflectable component that changes based upon deflection of the deflectable component.

9. The sensor of claim 1, wherein the titanium-based alloy includes titanium, at least one group IVa element, at least one group Va element other than titanium, and at least one interstitial element.

10. The sensor of claim 9, wherein the at least one group IVa element is from a group consisting of zirconium and hafnium, wherein the group Va element is from a group consisting of niobium, tantalum and vanadium, and wherein the interstitial element is from a group consisting of oxygen, nitrogen and carbon.

11. The sensor of claim 10, wherein the titanium-based alloy comprises a composition of Ti—24 at % (Nb+Ta+V)—(Zr, Hf)—O.

12. The sensor of claim 1, wherein the titanium-based alloy has a compositional average balance electron number [electron/atom (ea) ratio] of about 2.24; has a bond order (Bo value) of about 2.86 to about 2.90 based on a DV-Xα cluster method; and has a "D" electron-orbital energy level (Md value) of about 2.43 to about 2.49.

13. A pressure sensor comprising:
a first chamber; and
a diaphragm positioned adjacent the first chamber, the diaphragm formed of a titanium-based alloy having a Young's modulus of less than about 80 GPa and a tensile strength of greater than about 1,000 MPa.

14. The pressure sensor of claim 13 and further comprising:
a capacitance that varies as a function of deflection of the diaphragm.

15. The pressure sensor of claim 13 and further comprising:
a strain responsive device attached to the diaphragm for producing an output as a function of deflection of the diaphragm.

16. The pressure sensor of claim 13 and further comprising;
electrical contacts connected to the diaphragm to provide a resistance as a function of deflection of the diaphragm.

17. The capacitive pressure sensor of claim 13, wherein the titanium-based alloy has a Young's modulus of less than about 70 GPa.

18. The capacitive pressure sensor of claim 17, wherein the titanium-based alloy has a Young's modulus of about 60 GPa.

19. The capacitive pressure sensor of claim 13, wherein the titanium-based alloy has a tensile strength of greater than about 1200 MPa.

20. The capacitive pressure sensor of claim 13, wherein the titanium-based alloy includes group IVa and group Va elements.

21. The capacitive pressure sensor of claim 20, wherein the titanium-based alloy comprises a composition of Ti-24 at % (Nb+Ta+V)—(Zr, Hf)—O.

22. The capacitive pressure sensor of claim 13, wherein the titanium-based alloy has a compositional average balance electron number [electron/atom (ea) ratio] of about 2.24; has a bond order (Bo value) of about 2.86 to about 2.90 based on a DV-Xα cluster method; and has a "D" electron-orbital energy level (Md value) of about 2.43 to about 2.49.

23. A pressure sensor comprising:
a sensor body;
a diaphragm supported by the sensor body and deflectable as a function of the fluid pressure, the diaphragm having a Young's modulus of less than about 80 GPa and a tensile strength of greater than about 1000 MPa; and
means for producing an output representative of sensed pressure based upon deflection of the diaphragm.

24. The pressure sensor of claim 23, wherein the means for producing an output is responsive to a capacitance that changes as a function of deflection of the diaphragm.

25. The pressure sensor of claim 23, wherein the means for producing an output is responsive to a resistance that changes as a function of deflection of the diaphragm.

26. The pressure sensor of claim 23, wherein the means for producing an output is responsive to strain that changes as a function of deflection of the diaphragm.

27. The pressure sensor of claim 23, wherein the diaphragm has a Young's modulus of less than about 70 GPa.

28. The pressure sensor of claim 27, wherein the diaphragm has a Young's modulus of about 60 GPa.

29. The pressure sensor of claim 23, wherein the diaphragm has a tensile strength of greater than about 1200 MPa.

30. The pressure sensor of claim 23, wherein the diaphragm is formed of a titanium-based alloy.

31. The pressure sensor of claim 30, wherein the titanium-based alloy includes group IVa and group Va elements.

32. The pressure sensor of claim 31, wherein the titanium-based alloy comprises a composition of Ti-24 at % (Nb+Ta+V)—(Zr, Hf)—O.

33. The pressure sensor of claim 30, wherein the titanium-based alloy has a compositional average balance electron number [electron/atom (ea) ratio] of about 2.24; has a bond order (Bo value) of about 2.86 to about 2.90 based on a DV-Xα cluster method; and has a "D" electron-orbital energy level (Md value) of about 2.43 to about 2.49.

* * * * *